United States Patent [19]

Karlsson

[11] 4,045,014
[45] Aug. 30, 1977

[54] SHEET FILM MAGAZINE FOR AN X-RAY FILM EXCHANGER

[75] Inventor: Ronny Karlsson, Mamsellstigen, Sweden

[73] Assignee: Siemens Aktiengesellschaft, Berlin & Munich, Germany

[21] Appl. No.: 741,387

[22] Filed: Nov. 12, 1976

[30] Foreign Application Priority Data

Nov. 13, 1975 Germany .............................. 2551047

[51] Int. Cl.² .......................... B65H 1/04; B65H 5/02
[52] U.S. Cl. .................................... 271/8 R; 198/423;
221/76; 250/468; 250/469; 270/59; 271/3;
271/37; 271/151; 271/274; 271/275
[58] Field of Search ....................... 271/3, 8 R, 37, 38,
271/151, 216, 207, 274, 275, DIG. 9; 198/423,
462; 250/468, 469; 242/59, 67.3 R; 270/60, 59;
221/76, 218, 256

[56] References Cited

U.S. PATENT DOCUMENTS

| 789,707 | 5/1905 | Bellamy | 242/59 |
| 3,743,200 | 7/1973 | Hommerin | 271/8 R UX |
| 3,897,944 | 8/1975 | Grant | 271/3 |

FOREIGN PATENT DOCUMENTS 508,227  6/1939  United Kingdom ................. 198/462

Primary Examiner—Bruce H. Stoner, Jr.
Attorney, Agent, or Firm—Hill, Gross, Simpson, Van Santen, Steadman, Chiara & Simpson

[57] ABSTRACT

A sheet film magazine for an X-ray film exchanger includes a housing with a chamber, a drum rotatably mounted in the chamber and having a cylindrical surface, and a tooth belt mounted in the chamber with a portion urged toward the cylindrical surface with the teeth resting thereon. A leading end of each sheet inserted into the chamber is guided between the cylindrical surface and the belt. The drum and belt are driven in a stepwise manner with the distance of movement of the surface of the drum and the belt being equal to the distance between adjacent teeth on the belt.

10 Claims, 4 Drawing Figures

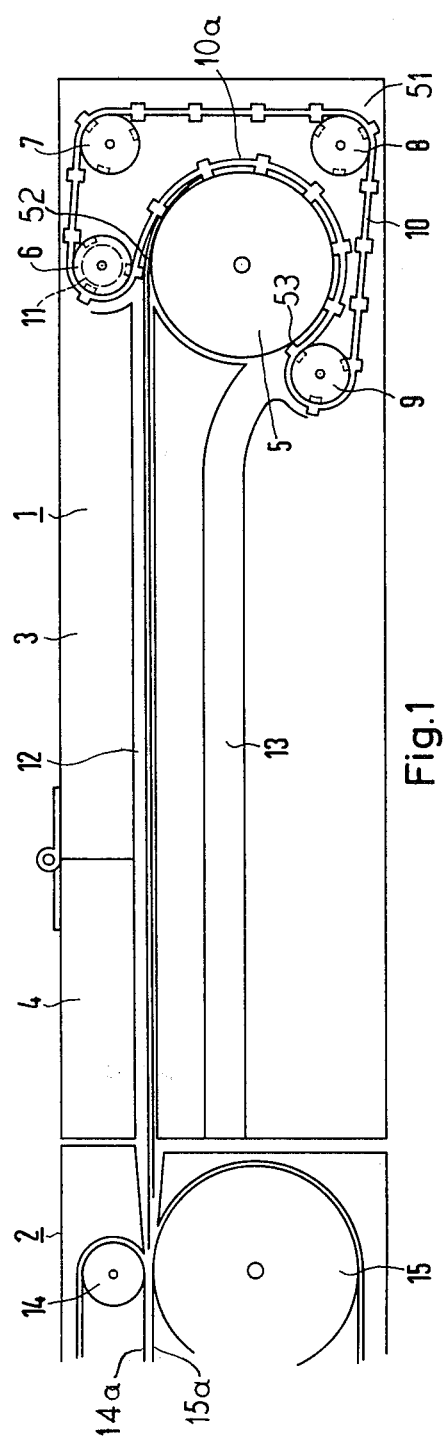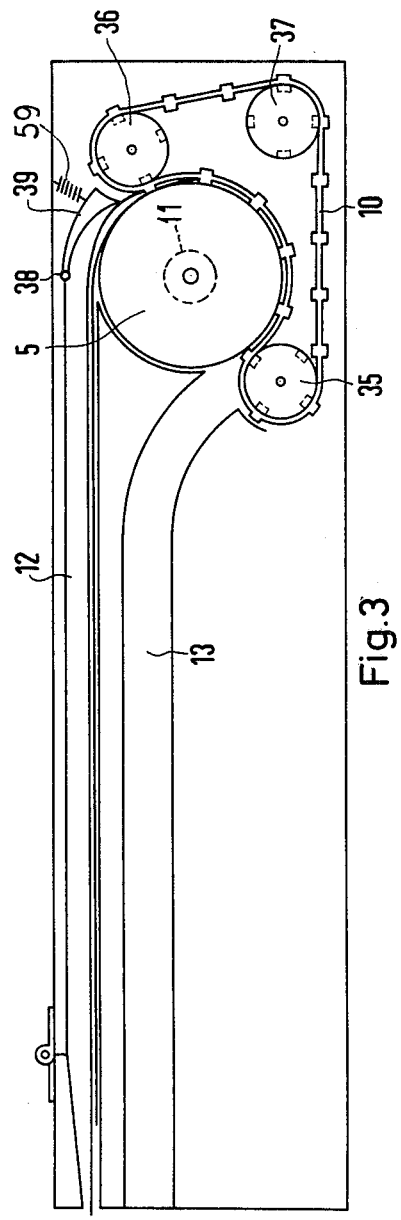

1

SHEET FILM MAGAZINE FOR AN X-RAY FILM EXCHANGER

BACKGROUND OF THE INVENTION

1. Field of the Invention

The present invention is directed to a sheet film magazine for an X-ray film exchanger which magazine stores the sheets of film between a cylindrical surface of the drum and a belt coacting therewith.

2. Prior Art

In a known type of sheet film magazine, the unexposed X-ray films are rolled from a supply roll and transported one after another between foils. The unexposed X-ray film together with the foils are then rolled onto a drum. A drawback of this prior art film magazine comprises the fact that the construction is expensive and that the operation of the magazine is expensive due to the requirement of supplying the foils.

Another known plane-film exchanger comprises a storage container for the unexposed sheets of film. Radially shiftable, mounted friction members are present for transporting the sheets of film from the storage container to the exposure station. Due to friction, the rotating friction members will guide the film in a direction toward the exposure station and insert the film between intensifying foils or plates with a great deal of speed. However, this known device usually damages the surface of the unexposed film during the fast rotation of the friction members. Furthermore, it is possible that several film sheets will be seized simultaneously by the rotating friction members and inserted together between the foils.

In U.S. Pat. No. 3,448,979, a technically complicated system or device for transporting film sheets from a stack is described. In addition, the device may accidentally simultaneously sieze more than one sheet at a time. Furthermore, this device is position dependent, i.e. it can only be used in certain positions.

SUMMARY OF THE INVENTION

The present invention is directed to providing a sheet film magazine which can be used in any position, which gently handles each of the sheets of film, and which will only discharge one sheet of film at a time.

To accomplish these tasks, the invention is directed to a sheet film magazine for an X-ray film exchanger, which has means for transporting individual unexposed sheets of film received from a magazine to an exposure station. The magazine has a housing with a chamber, a drum mounted for rotation in the chamber and having a cylindrical surface, a belt having a set of teeth spaced along one surface thereof, means for mounting the belt for movement along a path in the chamber with a portion of the belt being biased toward a portion of the cylindrical surface and the spaced teeth being urged into engagement with said portion of the cylindrical surface, means disposed in said housing for guiding a leading edge of an inserted sheet of film between the belt and cylindrical surface, and drive means connected to one of said means for mounting and the drum for rotating the drum and moving the belt in said path with the surface of the drum and the belt moving together in an incremental step-like manner with each step having a distance equal to the distance between adjacent teeth of the belt so that a portion of each sheet of film inserted into the magazine is engaged between the cylindrical surface and the belt and the leading edges of adjacent sheets are offset from each other a distance equal to the distance between adjacent teeth.

BRIEF DESCRIPTION OF THE DRAWINGS

FIG. 1 is a cross-sectional view with portions in elevation for purposes of illustration of a sheet film magazine in accordance with the present invention;

FIG. 3 is a cross-sectional view with portions in elevation for purposes of illustration of a second embodiment of a magazine in accordance with the present invention.

DESCRIPTION OF THE PREFERRED EMBODIMENTS

Figure 2:
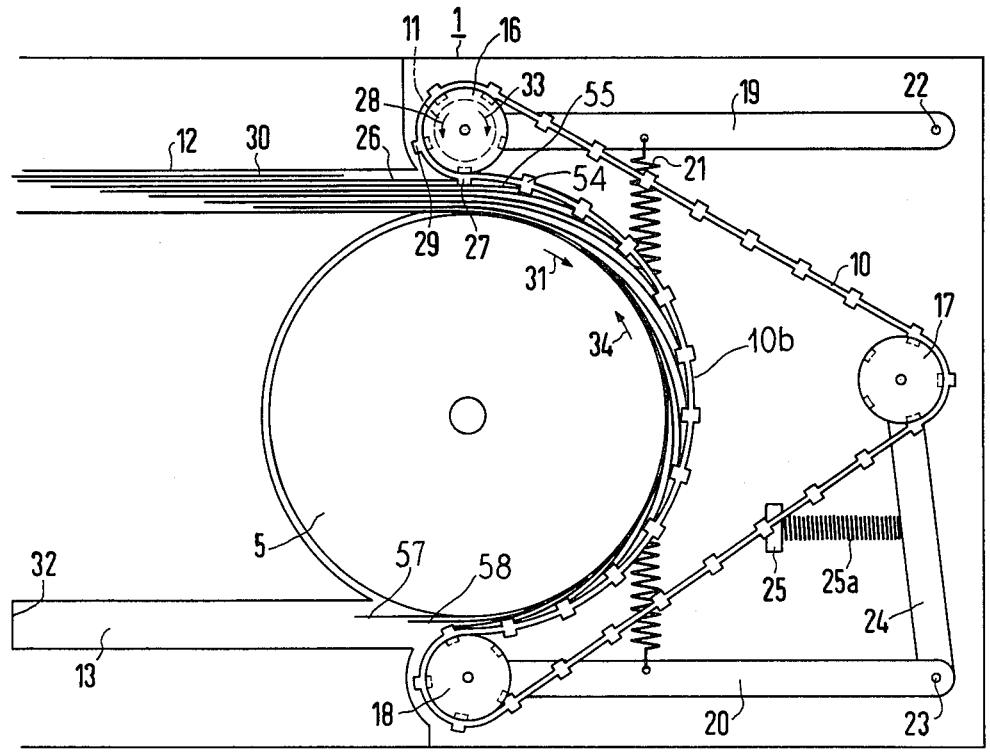
FIG. 2 is an enlarged cross-sectional view with portions in elevation for purposes of illustration of an embodiment of a magazine in accordance with the present invention.

The principles of the present invention are particularly useful in a sheet film magazine 1 illustrated in FIG. 1 which is utilized in connection with a film exchanger 2.

The magazine 1 comprises a housing 3 which is provided with a lid 4 attached to the housing by a hinge, and the lid 4 enables inserting individual sheets of film into an insertion slot or guide passage 12 during loading of the magazine 1. The housing 3 is illustrated as being formed of a plurality of sheet members joined together to provide the insertion passage 12, a reception chamber 13 and a chamber 51. It should be realized that the housing may be constructed of sheet members along with molded or solid members to obtain the desired configuration.

Magazine 1 includes a transport system for transporting individual unexposed sheets of film into the film exchanger 2. This transport system comprises a drum 5 which is mounted for rotation in the chamber 51 and an endless tooth belt 10. The drum 5 has a cylindrical surface with a portion being embraced by the endless tooth belt 10 which is supported by mounting means illustrated as four rollers 6, 7, 8 and 9. As illustrated, the endless tooth belt 10 has a first set of teeth spaced along one surface and a second set of teeth spaced on the opposite surface and aligned with the first set. The rollers 6 through 9, which have spaced grooves for receiving the second set of teeth, determine the path of movement of the endless belt 10 and as the belt moves along its path, a portion 10a of the belt which portion extends between rollers 6 and 9 is urged into engagement with the cylindrical surface of the drum 5 with the teeth facing the drum resting thereon. To urge portion 10a against the cylindrical surface of the drum 5, the rollers 6 and 9 are preferably mounted in the chamber 51 by means which biases or urges them toward the drum 5.

To move the belt along its path, a stepping motor 11 is arranged on an axis of the roller 6 and is connected to the roller 6 to drive both the belt 10 and rotate the drum 5. As illustrated, the portion 10a of the belt 10 begins to engage the surface of the drum 5 at a first point 52 adjacent the roller 6 and continues to engage the surface until it gets to an angular position or second point 53 adjacent the roller 9. The insertion passage 12 has an end adjacent the point 52 and the passage 12 acts as means to guide a sheet of film to this point. The reception chamber 13 is positioned with an opening adjacent the point 53 and the chamber 13 receives the leading ends of the sheet of film after they have been rolled between the surface of the drum 5 and the portion 10a of the belt and are passed through the arc of engagement of the belt 10 which is the portion 10a.

The film exchanger 2 has a pair of rotatable rollers 14 and 15 which support endless belts 14a and 15a. The belts 14a and 15a will sieze or engage a leading end of the sheet of film arriving from the passage 12 of the magazine 1 and transport the sheets toward the exposure station. While the rollers 14 and 15 are illustrated as supporting endless belts, the film exchangers may use a pair of coating rollers to act as the means for transporting the sheet of film to the exposure station.

An embodiment of the magazine is illustrated in FIG. 2 and the transport system of this embodiment has been modified with respect to the transport system illustrated in FIG. 1. As illustrated, the mounting means for the tooth belt 10 comprises three rollers 16, 17 and 18 and they define a path for the belt which has a smaller portion 10b, which extends between rollers 16 and 18 and engages the cylindrical surface of the drum 5. To support the rollers 16, 17 and 18, the roller 16 is mounted for rotation on one end of a lever 19 whose other end is pivotably mounted on an axle 22. In a similar manner, the roller 18 is mounted for rotation on one end of a lever 20 whose other opposite end is pivotably mounted on an axle 23. A spring 21 extends between the pair of levers 19 and 20 to bias or urge the rollers 16 and 18 toward the cylindrical surface of the drum 5. The third roller 17 is mounted for rotation on a third lever 24 whose other end is also pivotably mounted on the axle 23. A pressure spring 25a is disposed between a block 25, which is a part of the housing 2, and the lever 24 to urge the roller 17 away from the drum 5 and therefore the roller 17 maintains the desired tension on the belt 10. As illustrated, the stepping motor 11 is mounted on the axis of the roller 16 and drives this roller and thus causes movement of the belt and rotation of the drum 5.

As illustrated in FIG. 2, the magazine is almost completely loaded. During the loading process, each sheet of film is introduced into the guide passage or slot 12 one after another until the leading end comes into contact with a tooth of the belt 10. For example, the film sheet 26 has been inserted until its end rests on the tooth 27 which is coacting with the drum 5 to grip the previously inserted sheets. With this sheet 26 having its leading end engaging the tooth 27, the stepping motor 11 is moved one step in the direction of arrow 28 which moves the belt 10 and drum 5 in the direction of arrow 31. With such a movement, the tooth 27 and sheet 26 move to the position occupied by a tooth 54 and sheet 55 and the next tooth 29 moves to the position previously occupied by the tooth 27 to engage the film 26 and grip it with the previously inserted sheets between the tooth 27 and the cylindrical surface of the drum 5. It should be pointed out that the stepping motor 11 will move the belt 10 and also the drum 5 a given distance which is equal to the spacing between adjacent teeth such as 27 and 54. With the tooth 29 now assuming the position of the tooth 27, the next film sheet 30 is inserted until it engages the tooth 29, and thus occupies a position illustrated in FIG. 2 for the sheet 26 relative to the tooth 27. By energizing the stepping motor 11, the belts are again shifted in a clockwise direction and the drum 5 is rotated in the direction of arrow 31 so that the sheet 30 is then siezed or gripped between a tooth 29 and the adjacent sheets such as sheet 26.

With continual insertion of the sheets one at a time, the sheets are curved around the cylindrical surface of the drum 5 until the belt moves around the roller 18. At this point, the leading ends of the sheets such as 57 and 58 are disengaged from the belt 10 and drum and are received in the reception chamber or slot such as 13. When the magazine is full, the leading end of the initially inserted sheet 57 will rest against an end surface 32 of the reception chamber 13. With the magazine fully loaded, each sheet of film has at least a portion which is engaged or gripped between the belt and the cylindrical surface of the drum 5.

During transporting of the individual sheets one after another into the film exchanger 2, the stepping motor 11 is operated to drive the roller 16 in a direction of an arrow 33 in a step-by-step manner and the drum 5 will also be moved in the counterclockwise direction indicated by the arrow 34. Due to the distance of each step being equal to the distance between two adjacent teeth such as 27 and 54, only one sheet of film will be inserted between the rollers such as 14 and 15 of the film exchanger 2. It should be noted that the plurality of sheets of film are arranged with the leading edges of each of the adjacent sheets being spaced in a shingled, overlapping relationship with adjacent leading edges being spaced the distance equal to the distance between two adjacent teeth on the belt 10.

Another embodiment of the magazine 1 is illustrated in FIG. 3. In this embodiment, the endless tooth belt 10 is mounted by three rollers 35, 36 and 37. In the previous two embodiments, the passage or channel 12 acted as means for guiding the sheets or had an end opening adjacent to the first position such as 52 in FIG. 1; however, in the embodiment of FIG. 3, the roller 36 is spaced on the periphery of the drum 5 a substantial distance from the opening of the passage 12. To facilitate guiding of each individual sheet being inserted into the magazine, a guide member 39 is pivotably mounted at 38 adjacent the end of the channel 12. The guide member 39 has its free end urged toward the surface of the drum 5 by means such as the compression spring 59. The guide member 39 will guide the leading end of each inserted sheet of film into a correct position which is with the leading end inserted to engage a tooth of the belt as the belt begins to engage the cylindrical surface of the drum.

Figure 4:
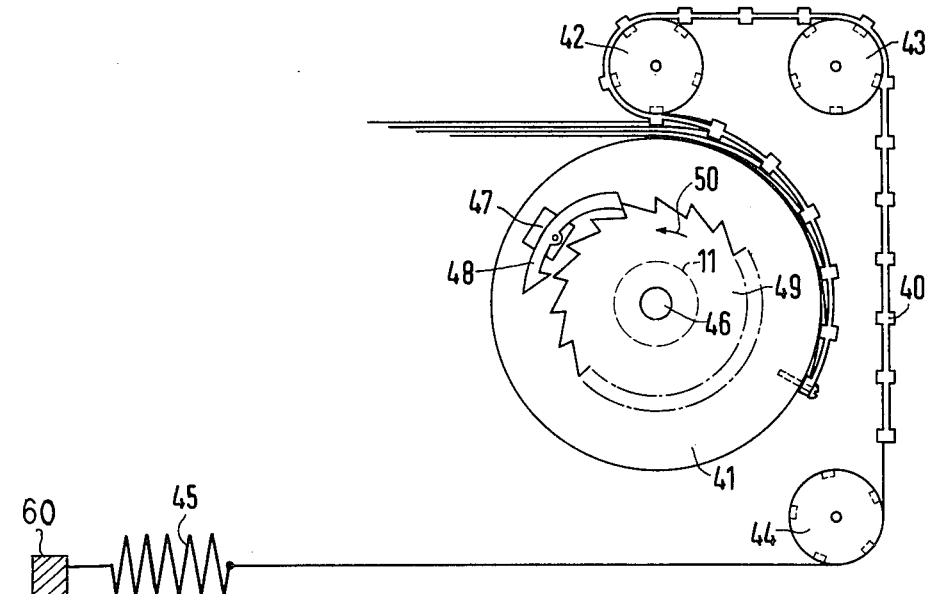
FIG. 4 is a partial cross-sectional view with portions in elevation of a third embodiment of the present invention.

In the three previous embodiments, the tooth belt 10 was a continuous belt. In the embodiment illustrated in FIG. 4, the tooth belt 40 has one end connected to a drum 41. The mounting means comprises rollers 42, 43 and 44 which support the belt in a path so that as the drum 41 rotates in a clockwise direction, it is wound on a cylindrical surface of the drum. The opposite end of the belt is connected to a tension spring 45 which is anchored on a portion 60 of the housing of the magazine. The means for rotating comprises a stepping motor 11 arranged on an axle 46 of the drum 41 and mechanical retard mechanism 47 having a pivotably mounted escapement lever 48. A tooth or ratchet gear 49 is mounted on the axle 46 and is engaged by the escapement lever 48 to prevent movement in the direction of the arrow 50.

During insertion of the films, the leading edges of each sheet of film are inserted between the belt 40 and the drum 41 with the leading edges of the adjacent sheets being offset a distance equal to the distance between the teeth. Unlike the previous embodiments, the leading edge of the first inserted sheet does not extend into any reception or storage chamber but is maintained between the belt and the drum as the drum winds the belt and sheets thereon.

The releasing or discharging of the loaded sheets of film is accomplished by the ratchet or sawtooth gear 49 moving step-by-step in the direction 50 due to the pull of the spring 45. This step-by-step movement is controlled by movement of the escapement lever 48 of the mechanical retard mechanism 47. Thus, the discharge of the sheets may be accomplished with the motor 11 being switched off. It should be noted that the spacing between adjacent teeth on the ratchet gear 49 is selected so that each step has a distance corresponding to the spacing between two adjacent teeth of the belt 40.

In all the embodiments, the film being discharged from the storage position on the storage device comprising the drum 5 and the belt 10 or the drum 41 and the belt 40 is siezed by the coacting transport means formed by the rollers such as 14 and 15 of the film exchanger 2. It should be pointed out that in each of the embodiments conventional means for preventing entrance of the light into the storage area are provided such as in passages 12.

Since the tooth belt always holds at least a portion of each of the film sheets against the drum, the sheet film magazine may be used in any desired position. It is also noted that the tooth belt 10 or 40 will release only a single sheet of film during each step of movement. Since the sheets of film are resiliently gripped between the belt and drum, the sheets are thus protected from damage to their surfaces.

While the invention has been discussed with regard to the embodiments of FIGS. 1 and 2 with the stepping motor 11 acting on one of the rollers of the mounting means for the belt, the motor 11 (FIG. 3) may be directly attached to the axle of the drum 5 to directly rotate the drum with the rotation of the drum causing the movement of the belt. To prevent any slipping between the belt and drum, the motor 11 may be directly connected to both a drum and roller by known drive means such as a chain drive. In each of the embodiments, the drive means for the drum and its respective belt has been described as a stepping motor or a stepping motor with an escapement mechanism. In each embodiment, the drive mechanism may be a manually operated means which would eliminate the need of providing the stepping motor.

Although various minor modifications may be suggested by those versed in the art, it should be understood that I wish to employ within the scope of the patent warranted hereon, all such modifications as reasonably and properly come within the scope of my contribution to the art.

I claim:

1. A sheet film magazine for an X-ray film exchanger which has means for transporting individual unexposed sheets of film received from the magazine to an exposure station, said magazine having a housing with a chamber, a drum mounted for rotation in the chamber and having a cylindrical surface, a belt having a set of teeth spaced along one surface thereof, means for mounting the belt for movement along a path in the chamber with a portion of the belt being biased toward a portion of the cylindrical surface and the spaced teeth being urged into engagement with said portion of the cylindrical surface, means disposed in said housing for guiding a leading edge of an inserted sheet of film between the belt and cylindrical surface, and drive means connected to one of said means for mounting and the drum for rotating the drum and moving the belt in said path with the surface of the drum and the belt moving together in an incremental step-like manner with each step having a distance equal to the distance between adjacent teeth on the belt, so that a portion of each sheet of film inserted into the magazine is engaged between the cylindrical surface and the belt and the leading edges of adjacent sheets are offset from each other a distance equal to the distance between adjacent teeth.

2. A sheet film magazine according to claim 1, wherein the belt is an endless belt, wherein the means for mounting comprises a plurality of rollers supporting the belt for movement in the given path with a first point where the teeth of the belt engages the cylindrical surface and a second point where the teeth of the belt disengages the cylindrical surface, wherein the means for guiding is disposed adjacent said first point, and which magazine further includes a reception chamber in the housing adjacent said second point for receiving the leading edge portions of sheets of film as they are being discharged at said second point.

3. A sheet film magazine according to claim 2, wherein said mounting means includes means biasing at least one of said rollers toward said cylindrical surface of the drum to ensure biasing teeth of the belt into engagement therewith.

4. A sheet film magazine according to claim 3, wherein the mounting means includes a pair of levers mounted for pivotal movement in said chamber, each lever supporting one of said plurality of rollers, and said means for biasing comprises a spring extending between said pair of levers.

5. A sheet film magazine according to claim 3, wherein the drive means comprises a stepping motor driving the drum.

6. A sheet film magazine according to claim 3, wherein the drive means comprises a stepping motor connected to one of said plurality of rollers for driving said rollers.

7. A sheet film magazine according to claim 1, wherein said housing includes a passage for moving the film to and from the chamber containing the drum, said passage having an end adjacent said drum, and wherein said guide means comprises a guide member pivotably mounted at the end of said passage with a free end of the member being urged against the cylindrical surface of said drum.

8. A sheet film magazine according to claim 1, wherein an end of the belt is attached to the cylindrical surface of the drum, and the other end of the belt is connected to a tension spring having an end attached to a point in the housing, and said drive means comprises a stepping motor connected to said drum.

9. A sheet film magazine according to claim 8, wherein said drum has a ratchet gear attached thereto and said drive means includes a retard mechanism having an escapement lever engaging said ratchet gear.

10. A sheet film magazine according to claim 1, wherein said tooth belt has a second set of teeth on an opposite surface to said one surface, said teeth being evenly spaced on said opposite surface, and wherein said means for mounting the belt includes a plurality of rolls each having grooves matching the spacing of said second set of teeth for receiving said teeth.

* * * * *